Aug. 3, 1943.   V. SPENCER   2,326,105
METHOD OF MAKING FLEXIBLE HARD SURFACE
COVERINGS AND APPARATUS THEREFOR
Filed Aug. 1, 1940   3 Sheets-Sheet 1

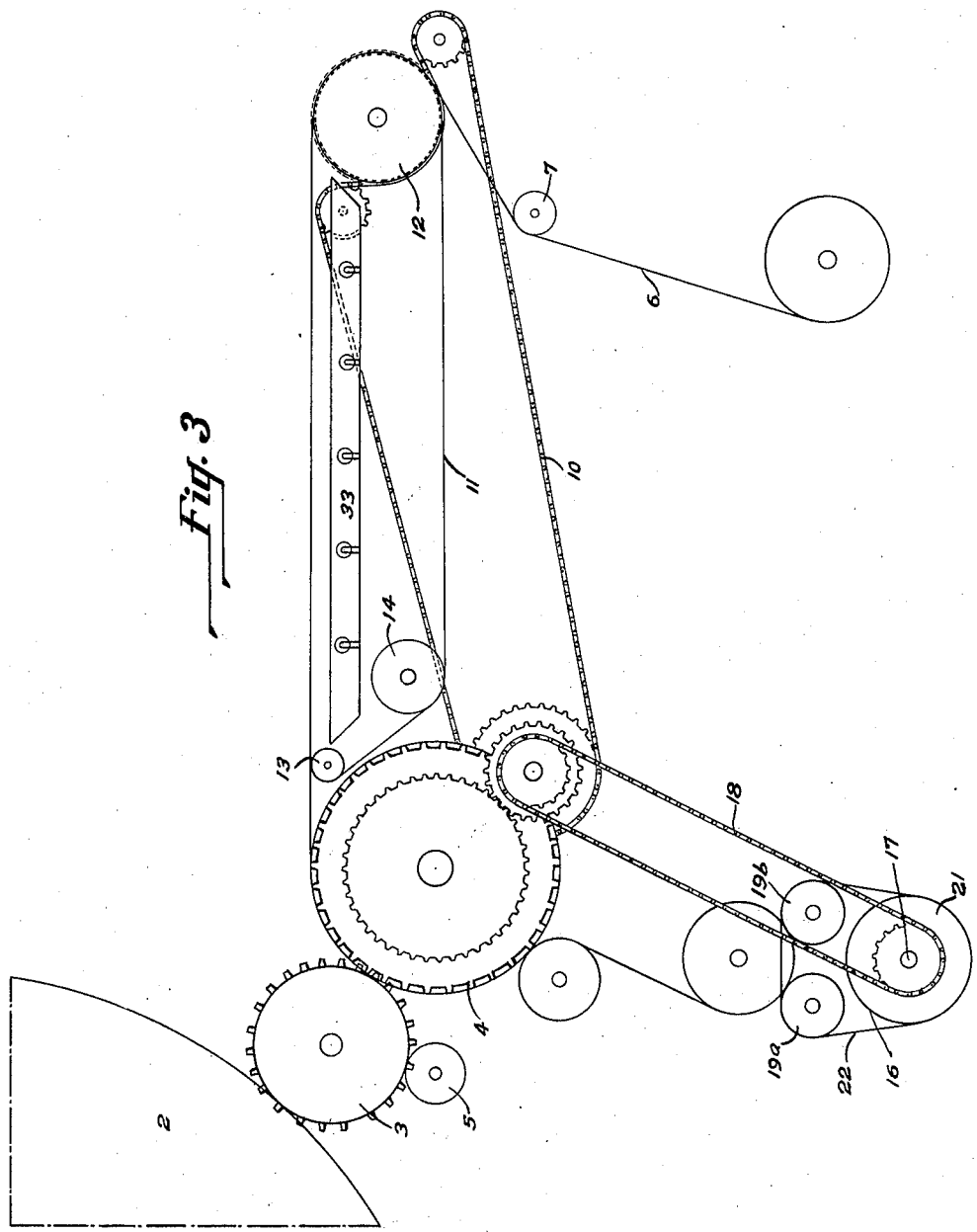

Patented Aug. 3, 1943

2,326,105

UNITED STATES PATENT OFFICE 2,326,105

METHOD OF MAKING FLEXIBLE HARD SURFACE COVERINGS AND APPARATUS THEREFOR

Virgil Spencer, Lancaster, Pa., assignor to Armstrong Cork Company, Lancaster, Pa., a corporation of Pennsylvania Application August 1, 1940, Serial No. 349,333

17 Claims. (Cl. 154—24)

This invention relates to a method of making flexible hard surface coverings and apparatus therefor and is herein particularly described with respect to the manufacture of inlaid linoleum. My invention provides a method whereby a wide variety of patterns may be produced at a low cost.

A method of making linoleum commonly used in the industry comprises die-cutting pattern elements from sheets of linoleum mix and applying such elements to a backing. This method is adaptable to continuous machine production and a rotary type of machine for carrying out such process is well-known in the industry. Rotary type machines are very expensive and are capable of producing only a limited range of patterns. While it is possible to vary the pattern by changing the die rolls employed, such machines are capable of applying only a relatively small number of colors. This limitation is serious since the trend of the industry is toward patterns employing a wide variety of colors and design elements of complicated geometrical configuration.

The rotary machine consists essentially of a large drum which carries the backing or web to which the design elements are to be applied. These design elements are cut from unbacked sheets of linoleum composition by means of die rolls which lie substantially tangent to the drum. Each die roll is supplied with a web of linoleum mix which is as wide as the product of the machine. Each die roll is effective for cutting this web into small pieces. Those pieces which form no part of the finished design are discharged as scrap and the remaining pieces are applied by the die roll to the backing. A separate die roll must be employed for each color of material appearing in the finished pattern. It follows that if three colors are employed, the amount of scrap is twice the area of the goods, and if four colors are employed, the amount of scrap is three times the area of the goods. The amount of scrap produced may be expressed by the following formula: $S=A(N-1)$, where S equals the amount of scrap produced, A equals the area of the finished product, and N equals the number of colors employed.

Sometimes this scrap may be milled and used over again but, particularly in many colors and in the marbles and jaspes, is is difficult if not impossible to use the scrap because of the difficulty of controlling color. It is therefore clear that the ordinary rotary machine cannot be economically employed in the manufacture of designs employing a great variety of colors. It is, however, highly desirable to produce linoleum of this character at the speeds which are obtainable only by the rotary machine.

Another serious disadvantage involved in the production of linoleum by rotary types of inlaying machines resides in the limited repeat of patterns produced thereby. The pattern in linoleums made by rotary machines usually repeats itself every 18 inches. The circumference of the die rolls employed is usually 54 inches and each die roll as is well-known is provided with scrap ejectors which are actuated by scrap rolls lying within the die rolls. The size of the scrap roll is usually such that it makes three revolutions for each revolution of the die roll, thus giving the repeat length of ⅓ of 54 inches or 18 inches. It is particularly desirable that the repeat length be increased so that the repeat of the pattern is not so apparent to a casual observer.

In Humphreys Patent 1,911,364, issued May 30, 1933, entitled Method of making flexible hard surfaced coverings, there is disclosed a method of making linoleum by the use of a rotary type of machine in which the die rolls apply pattern elements to a portion only of the backing or base, the uncovered portions of the base being later covered with design elements by hand. This method permits a greater variety of colors to be employed and increases the repeat length to some extent but, of course, is applicable only in cases where a small number of design elements of common geometrical configuration need be filled in by hand. If a large number of design elements need be applied by hand, the speed of the machine is so greatly reduced as to render the process extremely expensive and hence impracticable. A disadvantage of this process resides in the fact that such inserted design elements must be of common geometrical configuration, such as small squares, rectangles, hexagons, or octagons, for example. If the design elements are large and of complicated geometrical configuration, they cannot be laid by hand. This is due primarily to the fact that the uncured, unbacked linoleum element possesses insufficient strength to permit it to be handled without injury thereto. Since the element is of complicated configuration, it could not be readily and quickly positioned by hand in its proper place in the pattern. Thus, the Humphreys process is of no assistance if it be desired to insert large, differently colored, design elements of complicated configuration in patterns produced by machines of the rotary type. As pointed out above, if the usual process be followed, the amount of scrap produced is so great as to render the process impracticable due to its expense.

My invention has for its chief object to provide a method of making flexible hard surface coverings by which a great variety of different colored design elements may be provided in the completed product. An object of my invention is to provide a method whereby a great variety of differently colored design elements may be provided in the completed product without the production of an excessive amount of scrap or waste material. A further object is to provide an economical method of producing flexible hard surface coverings possessing a great variety of differently colored design elements at a high rate of speed. A still further object is to provide a method of making flexible hard surface coverings on rotary type machines in which the amount of scrap or waste material created in the production of such material is greatly decreased. A still further object is to provide a method of making flexible hard surface coverings by which the repeat length of the pattern may be considerably increased without creating an excessive amount of scrap. A still further object is to provide an apparatus capable of producing flexible hard surface coverings containing a great variety of colors at a low cost.

This invention relates to a method of making flexible hard surface coverings in which design elements are applied to a backing in predetermined position to form a finished design, the steps comprising placing sheets of facing material in required position on a web, feeding the web carrying such sheets to a die roll adapted to sever the sheets in design elements and scrap, severing said sheets into design elements and scrap, removing the web from the die roll, discharging the scrap, and laying the design elements on a backing.

This invention further relates to the combination with an inlaying machine having a die roll adapted to sever design elements from sheets of facing material and apply them to a backing, of a web adapted to carry sheets of facing material to the die roll, said web having design indicia to indicate the proper position of sheets thereon, and means for removing the web from the die roll.

The attached drawings illustrate a preferred embodiment of my invention, in which Figure 1 is a diagrammatic view of a device for carrying out my process;

Figure 3 is a diagrammatic view of a modification of the device shown in Figure 1;

Figure 4 is a fragmentary view of a die roll; and

Figure 5 is a fragmentary view of an embossing roll.

Figure 1:
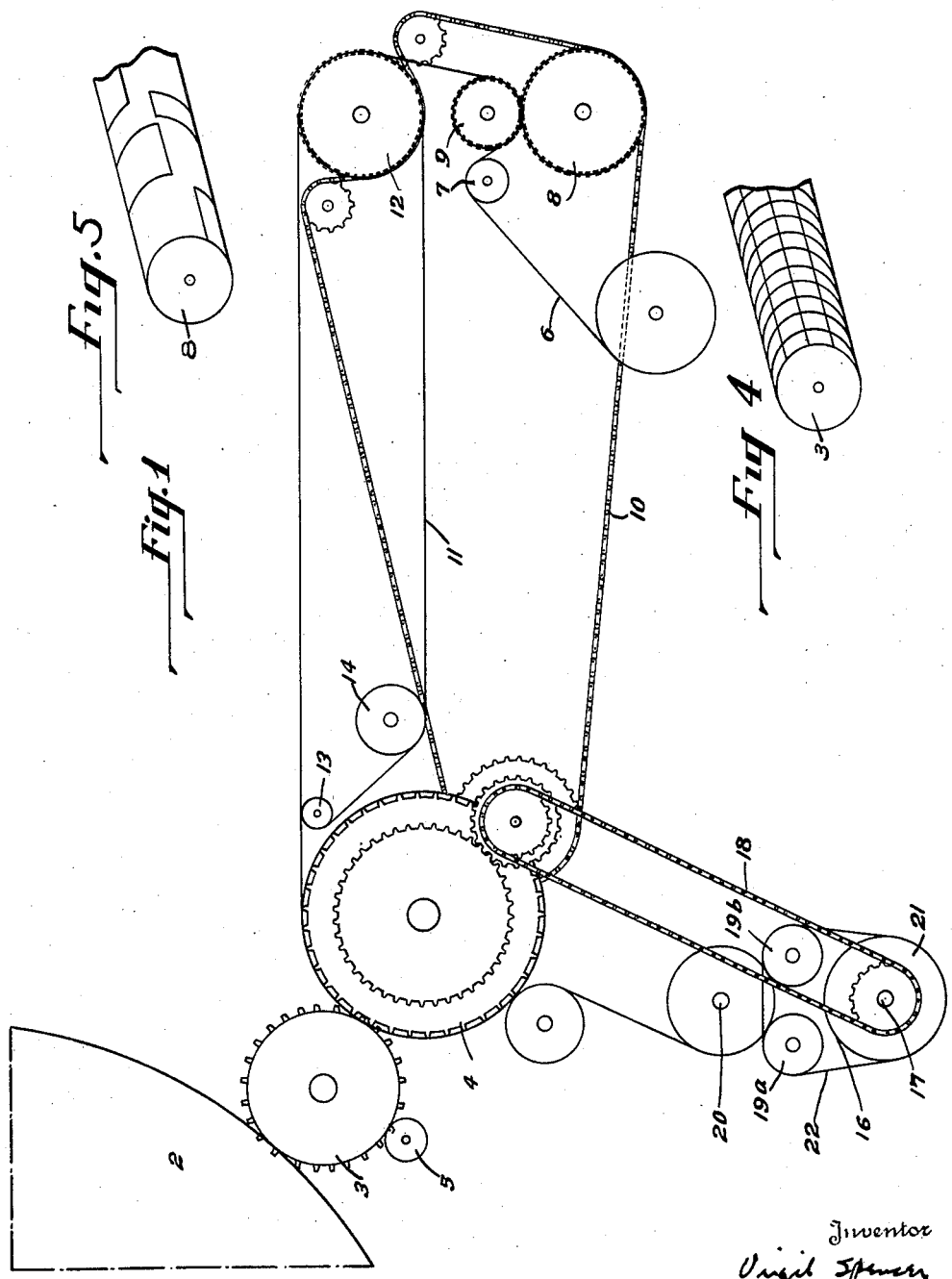

Referring to the drawings, there is shown a rotary drum 2 and a die roll 3 positioned substantially tangent to the drum 2. Only a single die roll is shown but it will be understood any desired number of die rolls may be used depending upon the various types and colors of design elements used in the completed pattern. The specific construction of the die roll is not illustrated for die rolls are well-known in the art, reference being had to Walton Patent No. 626,117, granted May 30, 1899, for a specific example of die roll suitable for use in the present invention. Adjacent to the die roll 3 is placed a cutting roll 4 which is synchronized with the die roll 3 by means of suitable gearing and which serves as a platen roll for the die roll. A sheet of linoleum mix is fed to the die roll 3 and is severed into desired design elements by the die roll. The sheet of linoleum, preferably, is not severed completely through since so doing would necessitate that the knives of the roll 3 bear against the roll 4 and so render them dull or blunt in a short time thus considerably increasing the cost of maintenance. A brush roll 5 is provided adjacent the die roll 3 which brushes or forces the substantially severed sheet against the knives of the die roll 3 thus completing their severance into design elements of desired size and shape. The die roll 3 then discharges as scrap the pieces of linoleum mix which form no part of the finished design and applies the remaining elements to a backing carried over the drum 2.

This is the usual process for making linoleum on rotary types of inlaying machines. The sheet of linoleum mix fed to the die roll is at least equivalent in width to the width of the die roll and hence the amount of scrap or waste material produced is enormous. Each die roll severs design elements from a single sheet of linoleum mix so that a limited number of colors appear in the completed pattern. To eliminate these disadvantages, I provide a method and means whereby relatively small sheets or blocks of linoleum mix, of different colors if desired, may be fed to the die roll, each of such sheets or blocks being only slightly larger than the design element to be severed therefrom. Such small sheets or blocks may be of any desired colors so that a large number of colors may appear in the finished pattern if desired with a considerable decrease in the amount of scrap produced over processes heretofore used in the industry. Even if an increased number of different colors are not desired in the completed pattern, my invention is of considerable assistance since it substantially limits scrap or waste material without any decrease in speed of the operation.

A web 6 of strong, flexible paper, fabric or felt is fed over an idler roll 7 and between an embossing roll 8 (Figure 5) and a platen roll 9; the embossing roll 8 impresses design indicia on the web 6 in accordance with the completed linoleum pattern to be later formed, for a purpose hereinafter described. It will be understood a suitable printing device may be used in place of rolls 8 and 9; when design indicia are printed on the web 6 it is desirable that a quick-drying ink be used in order that such indicia will be dry when small sheets of linoleum mix are placed thereon. The embossing roll 8 is synchronized with the cutting roll 4 by means of the chain 10 and suitable gearing in order that the design indicia applied to the web 6 properly indicate the position of the sheets to be placed thereon. The web 6 bearing design indicia is then carried to a conveyor or endless belt 11 which carries it to the die roll 3 at a predetermined rate of speed. The conveyor 11 passes around suitable rolls 12, 13, 14 at least one of which, as illustrated, roll 12, is driven in synchronism with the cutting roll 4 by means of the chain 10 and suitable gearing connecting the roll 12 thereto so that the web 6 is delievered to the die roll 3 at a predetermined speed.

As the web 6 is progressively carried by the conveyor 11 to the die roll 3, small blocks or sheets of linoleum mix of any desired color are laid on the web 6 in positions indicated by the design indicia thereon. Such sheets or blocks may be laid by hand without detracting from the normal speed of the operation since they are preferably of simple geometrical configuration; since substantially all of the linoleum mix prepared is used in the production of these small simple units, the amount of scrap produced by my process is greatly decreased over that produced heretofore.

The web 6 arrying small sheets of linoleum mix in proper position thereon as indicated by the design indicia is fed to the die roll 3 by the conveyor 11 where the sheets are severed into design elements and scrap. Since each sheet is only slightly larger than the design element to be prepared therefrom, it will be appreciated the amount of scrap produced is minute in comparison with the amount of scrap produced by previous processes. Such scrap could be substantially or entirely eliminated, of course, were it not desirable to provide some slight margin of safety to ensure that complete design elements are formed; since the operation is run at a high speed, slight improper positioning of the sheets on the web 6 may occur and if the sheets were of the same dimensions as the design elements to be severed therefrom, such design elements would be incompletely formed.

The web 6 is then wound by a wind-up device 16 which likewise operates in synchronism with the cutting roll 4. The die roll 3 then discharges the scrap or waste material and lays the design elements in position on a backing carried over the drum 2. The wind-up device may comprise any suitable equipment for winding up or rolling the web 6 in a roll after it has carried the small sheets of linoleum mix to the die roll 3. Preferably, it is composed of a shaft 17 connected by a chain 18 and suitable gearing to the cutting roll 4, the shaft 17 being synchronized with the cutting roll 4 so that the web 6 is maintained taut and is accurately removed from the die roll 3 at a predetermined speed. Small rolls 19a and 19b receive the arbor 20 on which the web is to be rolled; such rolls 19a and 19b are rotated by the shaft 17 by means of the pulley 21 and the belt 22 and serve to rotate the arbor 20 thus winding or rolling the web 6. It will be appreciated any other suitable form of wind-up equipment may be used if desired.

Figure 2:
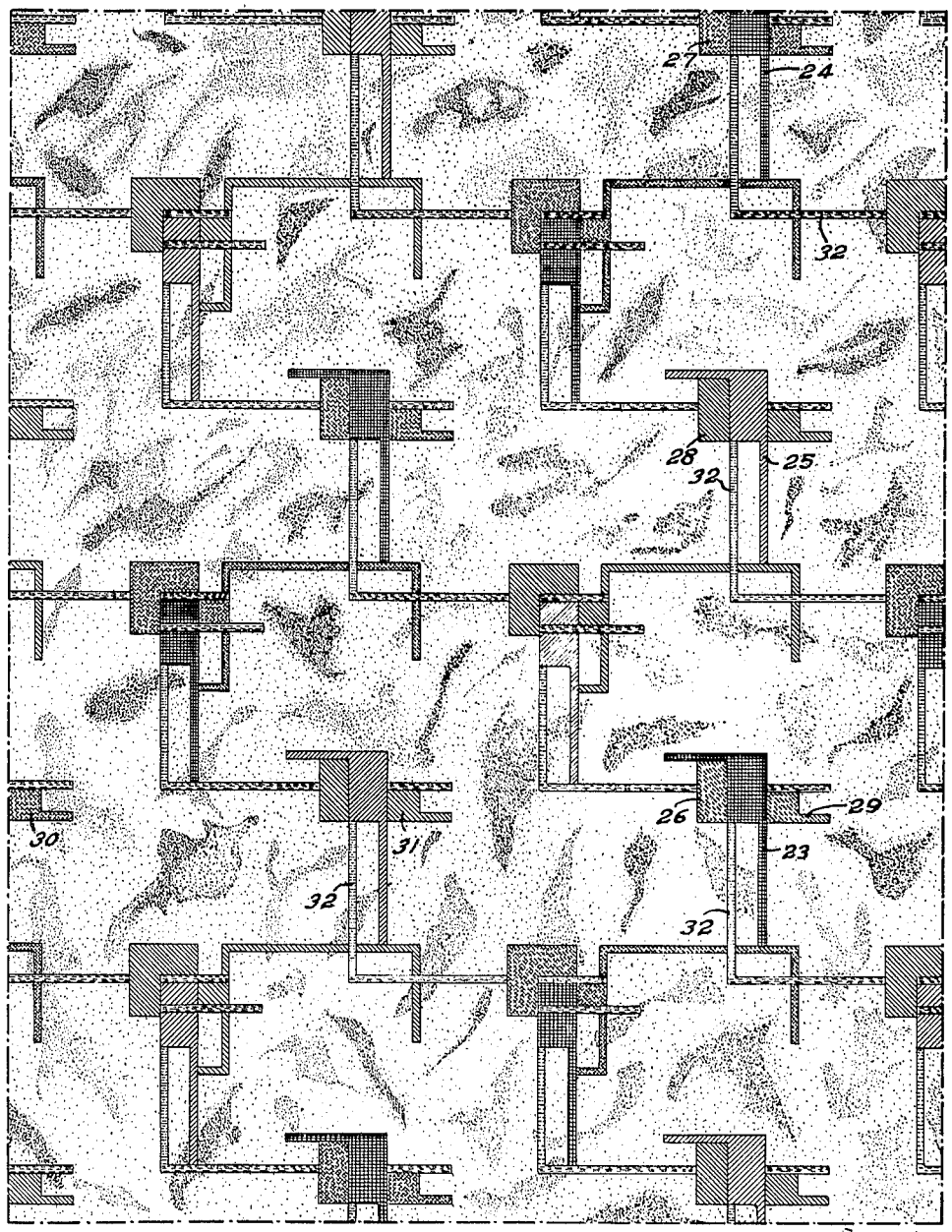
Figure 2 is a plan view of a portion of a sheet of linoleum produced in accordance with my invention.

In Figure 2, I have illustrated a portion of a sheet of linoleum produced in accordance with my invention. The pattern illustrated includes six different colors of which one color of course is the background color while the other five colors are used in the design elements inlaid in the background color. As illustrated, the repeat length of the inlaid design elements is 36", twice the repeat length procurable by previous processes. It will be understood by practice of my invention such repeat length may be increased to any desired length without any decrease in the speed of the machine. It will be noted design elements 23 and 24 longitudinally of the pattern are similar in color and configuration while the intervening design element 25 is of similar configuration but of different color. Likewise, design elements 26 and 27 are of similar color and configuration, different from design elements 23, 25, while the intervening element 28 is of similar configuration but of different color and is likewise different in color and configuration to design elements 23, 24, 25. The repeat laterally of the pattern is similar; element 29 is similar in color and configuration to element 30 while intervening design element 31 is similar in configuration to elements 29, 30 but different in color. Element 32, for example, is illustrated as of the same color and configuration throughout the pattern but it will be understood different colors may be used if desired. All of the inlaid design elements of course are different in color from the ground color or background. Monocolor or marble inlaid elements may be used while the ground may be of monocolor or marble appearance or any combination of monocolor or marble design elements may be used. The device illustrated in the drawing may be used to convey small sheets of linoleum mix to a single die roll while the remaining die rolls sever elements from a large web of linoleum mix or all of the die rolls used may be so equipped if desired for efficient, rapid and economical operation. In the pattern illustrated in Figure 2, it will be understood adjacent design elements 23 and 26, for example, should not be laid by the same die roll since it is desirable that the small sheets of linoleum mix fed to the die roll be slightly larger than the design element to be severed therefrom.

In Figure 3, there is shown a modified form of the device illustrated in Figure 1. The web 6 is formed of any suitable translucent material and is made opaque by heavy coats of paint or other suitable means in certain portions in accordance with a predetermined design. The web 6 is passed over the idler roll 7 to the conveyor 11. Beneath the conveyor 11 is disposed a member 33 adapted to direct light through the web 6 as it is carried along on the conveyor 11 to the die roll 3. The member 33 may comprise a reflector and a battery of lamps of any suitable intensity, so disposed as to direct light upwardly to the web 6. The light created by the member 33 passes through the translucent portions of the web 6 while it is being carried along the conveyor and forms or renders distinct design indicia thereon in a predetermined design thus serving to indicate the proper placement of small sheets of facing material to be carried to the die roll 3. It will be understood, of course, the conveyor 11 in which the web 6 is carried should be formed of any suitable material which will permit light to pass therethrough. It is necessary to prepare a web 6 having suitable translucent and opaque portions for each pattern or finished design desired. It will be understood the web 6 must be synchronized with the die roll 3 in order that the small sheets of facing material are properly disposed thereon in suitable positon to be fed to the die roll 3.

In operation, the web 6 is fed over the idler roll 7 to a conveyor 11 which is synchronized in operation with the die roll 3. As the conveyor 11 carries the web 6 to the die roll, the member 33 directs light against the web which passes through the translucent portions of the web and forms design indicia thereon to indicate to the operators the proper placement of small sheets of facing material thereon; small sheets of facing material are placed on the web in the places indicated and the web 6 carrying such small sheets of facing material is fed to the die roll 3, and the process carried out as described above.

It will be noted by the practice of my invention a large variety of differently colored design elements of different geometrical configuration may be used in the completed pattern. The amount of scrap produced is substantially reduced; this is an important feature of my invention since processes heretofore available for forming patterns including design elements of different colors and complicated geometrical configuration produced so much scrap as to be commercially impracticable. The method discussed above of inserting such elements by hand of course could not be used due to the inherent weaknesses of the unmatured linoleum mix and to the fact that the operation would necessarily be of such slow speed as to render it economically impracticable.

While I have described and illustrated certain preferred embodiments of my invention, it will be understood my invention is not so limited since it may be otherwise embodied within the scope of the following claims.

I claim:

1. In the method of making flexible hard surface coverings in which design elements are applied to a backing in predetermined position to form a finished design, the steps which comprise placing sheets of facing material in required position on a web, feeding the web carrying such sheets to a die roll adapted to sever the sheets in design elements and scrap, severing said sheets into design elements and scrap, discharging the scrap, and laying the design elements on a backing.

2. In the method of making flexible hard surface coverings in which design elements are applied to a backing in predetermined position to form a finished design, the steps which comprise placing sheets of facing material on a web having design indicia to indicate the proper placement of said sheets, feeding the web carrying said sheets to a die roll adapted to sever the sheets in design elements and scrap, severing said sheets into design elements and scrap, discharging the scrap, and laying the design elements on a backing.

3. In the method of making flexible hard surface coverings in which design elements are applied to a backing in a predetermined position to form a finished design, the steps which comprise forming design indicia on a web, placing sheets of facing material in required position on said web in accordance with the indicia thereon, feeding the web carrying said sheets to a die roll adapted to sever sheets in design elements and scrap, severing said sheets into design elements and scrap, discharging the scrap, and laying the design elements on a backing.

4. The method of making flexible hard surface coverings according to claim 3, in which the design indicia are printed on the web.

5. The method of making flexible hard surface coverings according to claim 3, in which the design indicia are embossed on the web.

6. In the method of making flexible hard surface coverings in which design elements are applied to a backing in predetermined position to form a finished design, the steps which comprise directing light through a web having translucent and opaque sections to render apparent design indicia thereon thus indicating the proper placement of sheets of facing material thereon, placing sheets of facing material on said web at the indicated positions, feeding the web carrying said sheets to a die roll adapted to sever the sheets into design elements and scrap, severing said sheets into design elements and scrap, discharging the scrap, and laying the design elements on a backing.

7. In the method of making flexible hard surface coverings in which design elements are applied to a backing in predetermined position to form a finished design, the steps which comprise feeding a web having translucent and opaque sections to a conveyor, directing light through said web to render apparent design indicia thereon while the web is carried by the conveyor, placing sheets of facing material on said web in accordance with the design indicia thereon while the web is carried by the conveyor, feeding the web carrying said sheets to a die roll adapted to sever the sheets into design elements and scrap, severing said sheets into design elements and scrap, discharging the scrap, and laying the design elements on a backing.

8. In the method of making flexible hard surface coverings in which design elements are applied to a backing in a predetermined position to form a finished design, the steps which comprise continuously forming design indicia in a web, continuously feeding the web carrying said indicia to a conveyor, placing sheets of facing material in required position on said web in accordance with the indicia thereon as it is progressively carried by said conveyor, feeding said web carrying the positioned sheets to a die roll adapted to sever the sheets in design elements and scrap, severing said sheets into design elements and scrap, discharging the scrap and laying the design elements on a backing.

9. In the method of making flexible hard surface coverings in which design elements are applied to a backing in predetermined position to form a finished design, the steps which comprise continuously forming design indicia on a web, placing sheets of facing material in required position on said web in accordance with the indicia thereon as it is being continuously moved forward, feeding said web carrying the positioned sheets to a die roll synchronized with the indicia forming means, said die roll being adapted to sever the sheets in design elements and scrap, severing said sheets into design elements and scrap, discharging the scrap, and laying the design elements on a backing.

10. In the method of making flexible hard surface coverings in which design elements are applied to a backing in predetermined position to form a finished design, the steps which comprise forming design indicia on a web, placing sheets of facing material in required position on said web in accordance with the indicia thereon, and feeding the web carrying said sheets to a die roll synchronized with the indicia forming means.

11. In combination with an inlaying machine having a die roll adapted to sever design elements from sheets of facing material and apply them to a backing, a web adapted to carry sheets of facing material to said die roll, said web having design indicia to indicate the proper position of said sheets thereon, and means for conveying the web past the die roll.

12. In combination with an inlaying machine having a die roll adapted to sever design elements from sheets of facing material and apply them to a backing, a web adapted to carry sheets of facing material to said die roll, means for forming design indicia on said web to indicate the proper position of said sheets thereon, and means for conveying the web past the die roll.

13. In combination with an inlaying machine having a die roll adapted to sever design elements from sheets of facing material and apply them to a backing, a web adapted to carry sheets of facing material to said die roll, means operating in synchronism with said die roll for forming design indicia in said web to indicate the proper position of said sheets thereon, and means for conveying the web past the die roll.

14. In combination with an inlaying machine having a die roll adapted to sever design elements from sheets of facing material and apply them to a backing, a web adapted to carry sheets of facing material to said die roll, means operating in synchronism with said die roll for continuously forming design indicia on said web to indicate the proper position of sheets thereon, a conveyor synchronized with said means for progressively moving said web to said die roll, and means for conveying the web past the die roll, said means being synchronized with the die roll.

15. An inlaying machine according to claim 12 in which the indicia forming means comprises a printing roll.

16. An inlaying machine according to claim 12 in which the indicia forming means comprises an embossing roll.

17. In combination with an inlaying machine having a die roll adapted to sever design elements from sheets of facing material and apply them to a backing, a web having translucent and opaque sections adapted to carry sheets of facing material to the die roll, means for directing light through said web to render apparent design indicia to indicate the proper position of said sheets thereon, and means for conveying the web past the die roll.

VIRGIL SPENCER.